United States Patent [19]

Silhouette

[11] 4,359,617

[45] Nov. 16, 1982

[54] WEIGHTED TRIGGER DEVICE

[75] Inventor: Jean-Max M. Silhouette, Melun, France

[73] Assignee: Societe Nationale d'Etude et de Construction de Moteurs d'Aviation, "S.N.E.C.M.A.", Paris, France

[21] Appl. No.: 196,056

[22] Filed: Oct. 10, 1980

[30] Foreign Application Priority Data

Oct. 12, 1979 [FR] France ................. 79 25737

[51] Int. Cl.³ ............................................. H01H 35/10
[52] U.S. Cl. ............................. 200/153 T; 200/80 R; 200/329
[58] Field of Search ............ 200/153 T, 329, 61.45 R, 200/61.46, 61.48, 80 R

[56] References Cited

U.S. PATENT DOCUMENTS

| 2,832,864 | 4/1958 | Rapp | 200/80 R |
| 2,836,670 | 5/1958 | Laas | 200/80 R |
| 2,856,479 | 10/1958 | Fletcher | 200/80 R |
| 2,872,540 | 2/1959 | Hager | 200/67 |
| 2,938,975 | 5/1960 | Williams | 200/80 R |
| 3,955,424 | 5/1976 | Williams | 73/550 |

FOREIGN PATENT DOCUMENTS

| 713944 | 8/1954 | United Kingdom | 73/550 |
| 952418 | 3/1964 | United Kingdom | 73/550 |

OTHER PUBLICATIONS

Product Engineering Publication, vol. 34, No. 6, Mar. 18, 1963, "Choosing a Speed Governor", by Boggs, pp. 78–88.

Primary Examiner—Willis Little
Attorney, Agent, or Firm—Oblon, Fisher, Spivak, McClelland & Maier

[57] ABSTRACT

A weighted trigger device in which the centrifugal force of weights revolving in conjunction with an input shaft is used to displace a movable element axially and in opposition to the force of a spring in order to trigger a control system. The resistance of the weight system is positive and greater at all points to the resistance of the spring.

6 Claims, 5 Drawing Figures

WEIGHTED TRIGGER DEVICE

BACKGROUND OF THE INVENTION

1. Field of the Invention

The invention concerns a weighted triggering device of the type in which an input shaft drives rotating weights, transforming the centrifugal force to which they are submitted into an effort which tends to displace a movable element along the axis of the device so as to trigger a control system such as an electrical switch or hydraulic or pneumatic valve as soon as the speed of rotation of the input shaft exceeds a preset level.

2. Description of the Prior Art

Weighted trigger devices of this type are frequently used in speed governors or servomechanisms. Accordingly, the most recent watt governors and jet servomechanisms are of this type.

In order to clarify the problem which has been solved by the present invention, FIG. 1 of the attached drawings provides a longitudinal, schematic, cross-sectional view of a conventional weighted trigger device. In this device, an input shaft 10 drives a rotating plate 12 having circumferentially spaced weights 14 capable of pivoting about axes 16 which are tangent to the peripheral edge of plate 12. The effect is to induce a movable element 18 towards a control system such as an electrical switch 20 in opposition to the force of a spring 22. Movable element 18 is thus submitted to two opposing forces: (I) force $F_M$ exerted by the weights and, (ii) force $F_R$ exerted by the spring.

Even if the resistance $dF_R/dx$ of spring 22, i.e., the variation of force $F_R$ as a function of the displacement x of movable element 18, can be considered as constant and always positive, the same cannot be said for the variation of force $F_M$ as a function of displacement x, i.e., of the resistance $dF_M/dx$ of the weights.

This observation is illustrated by FIG. 2 of the attached drawings. This figure represents the variations in force $F_M$ exerted by weights 14 on movable element 18 as a function of the angle $\theta$ (see FIG. 1) defined between the radial plane passing through pivot axis 16 of weights 14 and the axis connecting center of gravity G of the active mass of each of the weights to its pivot axis 16. Indeed, it can be seen from this figure that force $F_M$ varies along a curve having the approximate appearance of half a sine wave when angle $\theta$ varies between 0° and 180°. This force $F_M$ is zero when angle $\theta$ is zero, i.e., when the center of gravity G is disposed within the radial plane passing through pivot axes 16 and inwardly offset with respect to the latter. Force $F_M$ then grows and reaches its maximum value when angle $\theta$ is near 115°, then decreases beyond 115° until it again reaches a value of zero when angle $\theta$ is equal to 180°, i.e., when the center of gravity G lies in the radial plane passing through axes 16 and outwardly offset with respect to the latter.

Because of the generally limited travel of movable element 18, the range of variation of angle $\theta$, i.e., the possible displacement of weights 14, only extends over a small part of the curve represented in FIG. 2. The choice of the operating range of weights 14 thus simultaneously determines the average intensity of force $F_M$ and the average resistance $dF_M/dx$ of the weight system. Thus, if the operating range of the weights is selected in such a way that angle $\theta$ is always less than 100°, the resistance of the weights is always positive, whereas it is always negative if the operating range is chosen such that angle $\theta$ is always greater than 130°. The resistance of the weights may also be initially positive, then negative, if the operating range is such that angle $\theta$ varies between two limit values of approximately 100° and 130°, respectively.

Whatever their application, weighted trigger devices of the type defined above are sensitive to a given threshold speed of rotation of the input shaft for triggering some sort of control system, such as an electrical, hydraulic or pneumatic system. Whatever the system, it is of the binary type, i.e., it defines two stable positions which correspond, for example, to the opening and closing of a switch, valve or any other similar mechanism. Triggering of the system must therefore by unequivocal, particularly when the speed of rotation of the input shaft is made to undergo slight fluctuations about the triggering threshold.

In order to increase the speed of response of the device, most known systems are designed such that the force $F_M$ exerted by weights 14 on movable element 18 is as great as possible within the operating range of the device. Thus, referring again to FIG. 2, the operating range of the weights in known triggering devices is usually chosen such that angle $\theta$ varies from 90° to 130°, as illustrated by cross-hatched area I in FIG. 2. Generally, angle $\theta$ is very close to 115° when the displacement x of movable element 18 has reached its maximum value, i.e., when system 20 is triggered.

Nevertheless, in spite of apperances, this solution is not satisfactory for solving the problem posed by the unequivocal triggering of control system 20. In order to clarify the reasons for this, we refer to FIG. 3 in the attached drawings, which represents the variations in opposing forces $F_R$ and $F_M$ applied to movable element 18 as a function of the displacement x of said element between the two extreme positions x1 and x2 which it is capable of occupying. In this figure, force $F_M$ is represented for various values (N1, N2, etc.) of the speed of rotation of input shaft 10 when the operating range of weights 14 is as in cross-hatched area I in FIG. 2, as is the case in prior known devices. As illustrated in FIG. 3, the resistance $dF_M/dx$ of weight system 14 is then lower at all points to resistance $dF_R/dx$ of spring 22. A detailed analysis of the operation of a weighted device having these characteristics leads to the following observations.

When shaft 10 is not turning, force $F_M$ is zero and movable element 18 occupies position x1 due to the force $F_R$ exerted by spring 22. The point representing the equilibrium of element 18 is then point A in FIG. 3. When shaft 10 is turning at a speed N which is increasing, curve $F_M$, representing the force exerted by weights 14 against the force of spring 22, moves upward in FIG. 3, in such a way that the point representing the equilibrium of element 18 moves from point A toward point B. As long as curve $F_M$ remains below point B (corresponding to the value of force $F_R$ when the movable element is at x1), element 18 remains stationary. When force $F_M$ becomes greater than the value of force $F_R$ at point B, movable element 18 moves until a stable equilibrium has been established between the forces exerted by weights 14 and spring 22. This stable equilibrium is determined by the point of intersection between curves $F_R$ and $F_M$. The equilibrium point of the movable element therefore lies on curve $F_R$ between point B and point C, with the latter corresponding to the value of force $F_R$ when movable element 18 is at x2. Control system 20 is then triggered. When the speed of rotation of shaft 10 continues to rise, force $F_M$ becomes preponderant over force $F_R$, so that movable element 18 remains at x2. By contrast, if the speed of rotation of shaft 10 undergoes fluctuations when the system's equilibrium point is near point C, or between points B and C, curve $F_M$ representing the force applied by weights 14 to movable element 18 may drop temporarily by a certain value with respect to curve $F_R$, so that the equilibrium point of movable element 18 moves toward point B on curve $F_R$. Element 18 then moves away from the control system to be triggered. This has the consequence of causing several state changes in system 20 in a very short period of time and producing uncertainty as to the triggering of the system.

The preceding analysis shows that known weighted trigger devices do not make it possible to obtain a clear and precise triggering of the system to be controlled, but rather an uncertain triggering sensitive to passing variations in the speed of rotation of shaft 10. This type of triggering is obviously not desirable since it leads to both hesitation in control and premature wear of contacts.

SUMMARY OF THE INVENTION

Consequently, the purpose of the invention is to create a weighted triggering device, the structure of which may be essentially identical to the structure of known devices while the operating parameters are carefully selected so as to ensure a plain and clear triggering of the system to be controlled.

For this purpose, and in accordance with the invention, a weighted triggering device is proposed in which an input shaft drives rotating weights, transforming the centrifugal force to which the weights are submitted into an effort which tends to move a movable element along the axis of the device against the force exerted by a spring so as to trigger a control system as soon as the speed of rotation of the input shaft exceeds a preset level, said device being characterized in that the resistance of the weights is positive and greater than the resistance of the spring whatever the position of the movable element.

In order to show that a weighted device having these characteristics indeed makes it possible to obtain unequivocal triggering of the control system, we refer to FIG. 4 in the attached drawings, which represents two forces $F_R$ and $F_M$ applied by spring 22 and weights 14, respectively, to movable element 18, all of which are components of a control device having characteristics which conform to the present invention, i.e., in which the resistance $dF_M/dx$ of the weights is positive and higher than resistance $dF_R/dx$ of the spring.

As soon as the speed attained by input shaft 10 is such that the value of force $F_M$ at x1 becomes very slightly greater than the value of force $F_R$ at x1, the point of equilibrium of element 18 moves immediately from B' to C', i.e., element 18 comes to occupy extreme position x2 in which it triggers system 20. In fact, we see in FIG. 4 that for any displacement of element 18 from x1 towards x2 there corresponds an increase in the difference between force $F_M$ and $F_R$. Therefore, although the speed of rotation N of input shaft 10 is such that force $F_M$ exerted by the weights is equal to force $F_R$ of the spring when element 18 is at x1, force $F_M$ is greater than force $F_R$ by a value $\Delta F$ when element 18 is at x2. As a result, a variation in the speed of rotation of shaft 10 when element 18 is at x2 has no effect on that element as long as said variation does not reduce force $F_M$ by a value which is at least equal to $\Delta F$. Since value $\Delta F$ is set by appropriate selection of the resistances of weight system 14 and spring 22, the device according to the invention is perfectly stable and enables unequivocal triggering of the control system.

When the speed of rotation of input shaft 10 decreases, displacement of movable element 18 from x2 to x1 occurs only after force $F_M$ at x2 has become slightly lower than force $F_R$ at x2, i.e., below point C''. Movable element 18 then moves suddenly from x2 to x1, given that for any displacement of element 18 from x2 toward x1 there corresponds an increase in the difference between forces $F_R$ and $F_M$. The equilibrium point of element 18 is then symbolized by B'' in FIG. 4.

In the device according to the invention, the response of movable element 18 therefore shows hysteresis, the magnitude of which corresponds to the above-mentioned value $\Delta F$. This value is chosen in such a way as to ensure the stability of element 18 x1 and x2 when input shaft 10 undergoes small variations in speed, while at the same time ensuring the instability of the intermediate positions between x1 and x2.

According to one particular embodiment of the invention, the spring acts on the movable element through a pivoting lever with adjustable lever arms enabling the spring's resistance to be modified.

According to another characteristic of the invention, a mechanism is provided for adjusting the calibration of the spring in order to modify the threshold beyond which the control element is activated.

BRIEF DESCRIPTION OF THE DRAWINGS

Various other objects, features and attendant advantages of the present invention will be more fully appreciated as the same becomes better understood from the following detailed description when considered in connection with the accompanying drawings, and wherein.

DETAILED DESCRIPTION OF THE PREFERRED EMBODIMENTS

Figure 5:
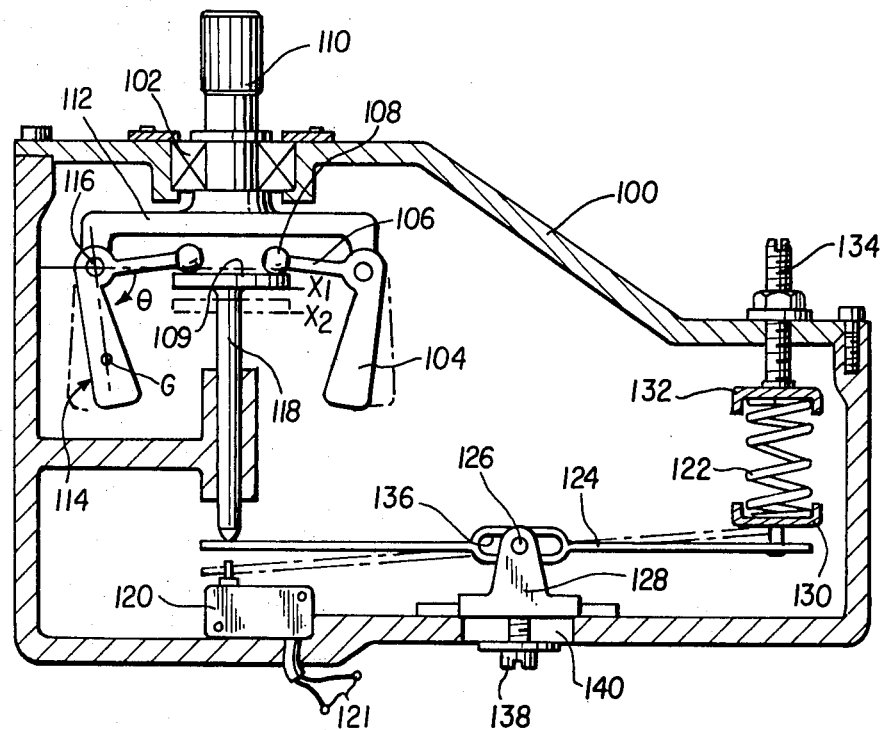
FIG. 5 shows a preferred embodiment of the present invention.
Figure 2:
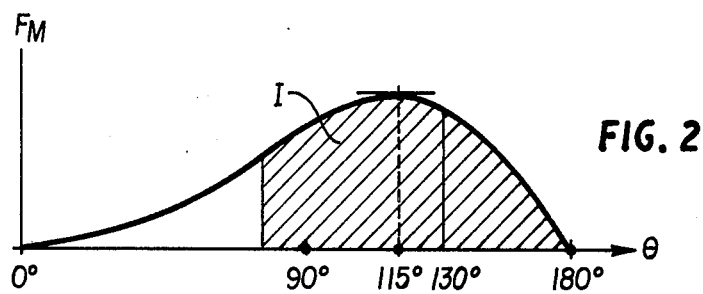
Figure 3:
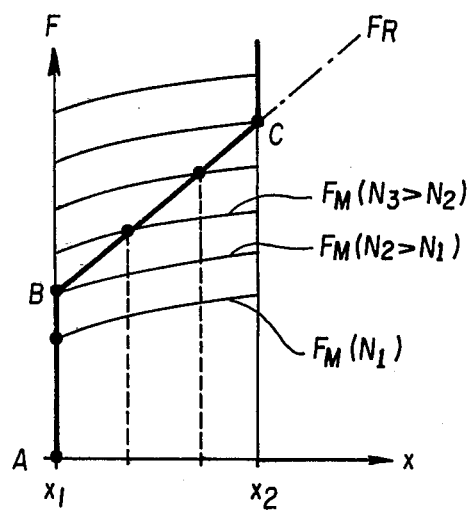

We will now describe, by way of non-limitative example, a particular embodiment of the invention, making reference to FIG. 5 of the attached drawings, which represents a weighted trigger device constructed in accordance with the teachings of the present invention.

The weighted trigger device represented in FIG. 5 includes a housing 100 into which enters an input shaft 110 capable of being driven in rotation by an external system (not shown), of which the speed of rotation is to trigger activation of another system (not shown) above a certain threshold speed or is to be controlled by means of the device of the invention.

Input shaft 110 is mounted so as to turn within housing 100 through a bearing 102 and supports, within the housing, a plate 112, at the periphery of which pivot V-shaped weights 114, the apexes of which pivot on axes 116 oriented tangentially with respect to plate 112. Each weight 114 comprises a head 104 disposed essentially parallel to the axis of shaft 110 and away from plate 112, and a tail 106 extending essentially radially toward the axis of shaft 110 and cooperating, by means of a roller 108, with a supporting surface 109 defined on element 118, which is coaxial with shaft 110. Element 118 is able to slide parallel to its axis between two extreme positions x1 and x2, in which the end of element 118 opposite surface 109 is either distant from a control system (such as electrical switch 120) or engaged with it, respectively. Switch 120, supported by housing 100, is capable of being connected to the system to be controlled by electrical terminals 121.

Between the end of element 118 which is opposite surface 109 and switch 120 is disposed one end of a lever 124 mounted so as to pivot about an axis 126 supported by an element 128 affixed to housing 100. The other end of lever 124 supports a cup 130 on which rests a helicoidal compression spring 122, the other end of which presses against another cup 132 affixed to housing 100 by means of a threaded rod 134. Lever 124 further comprises an oblong opening 136 into which axis 126 fits. Element 128 supporting said axis is fastened to housing 100 by means of a screw 138 which fits into a slot 140 parallel to lever 124.

Figure 4:
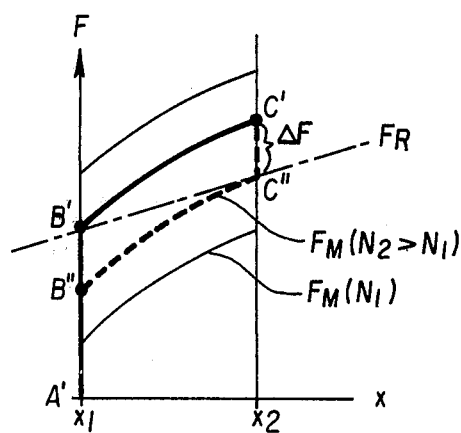
FIG. 4 illustrates weighted device characteristics.

The device which has just been described with reference to FIG. 5 is conceived in accordance with the invention, i.e. the resistance of weight system 114 is positive, as shown in the figure by the fact that angle $\theta$ is smaller than 100° whatever the position of element 118, and is greater than the resistance of spring 122 whatever the position of element 118. The device therefore operates in accordance with the curve of FIG. 4 described above, i.e., the displacement of element 118 between extreme positions x1 and x2 is sudden, producing unequivocal triggering of switch 120, so that said switch is not opened and closed several times in succession in case of minor fluctuations in the speed of rotation of input shaft 110.

In addition, the device represented in FIG. 5 makes it possible both to adjust trigger threshold B' of system 120 and hysteresis value $\Delta F$. In fact, the calibration of spring 122 may be modified by tightening or loosening threaded rod 134 within housing 100, which modifies the triggering threshold B' of the device. Similarly, element 128 supporting pivot axis 126 of lever 124 may be moved by loosening screw 138, which enables modification of the ratio between lever arms 124. It is thus possible to modify the slope of the force $F_R$ acting on element 118 through lever 124, which makes it possible to selectively adjust the value of said slope to the value of the slope of force $F_M$ exerted by weights 114 on element 118. Such adjustment thereby makes it possible to modify hysteresis value $\Delta F$.

Figure 1:
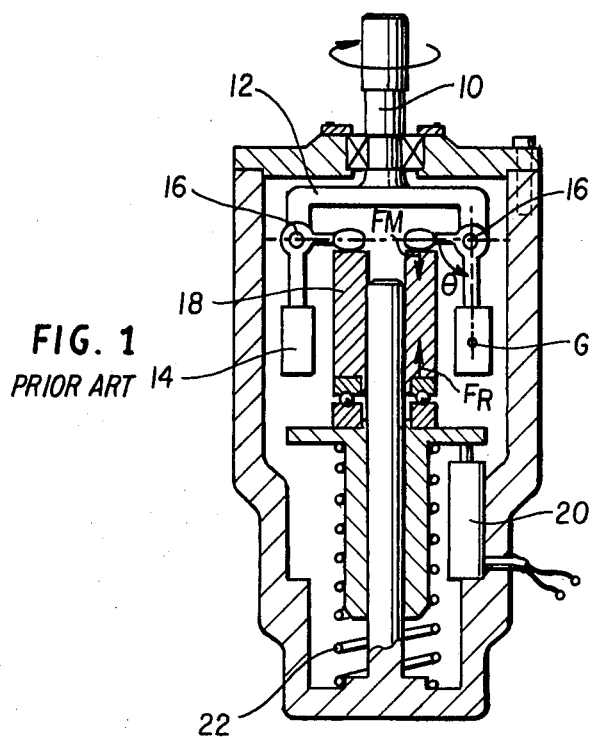
FIGS. 1-3 show a conventional weighted triggering device and its operational characteristics.

Of course, the invention is not limited to the embodiment which has just been described by way of example, but rather covers all variants. Thus, the improvements described with reference to FIG. 5, which enable the triggering threshold of the device and the hysteresis value to be adjusted, could possibly be eliminated without departing from the scope of the invention. The device would then appear in a form substantially identical to that of earlier devices of the type described with reference to FIG. 1. The essential difference would lie in the choice of the respective resistances of spring and weight system, with such choice generally having as its single visible consequence the possible modification of the angle $\theta$ defined by the weight system. In practice, this angle will generally be slightly smaller in the device of the invention than in known devices, as evidenced by the fact that the heads of the weights are more pronouncedly inclined toward the axis of rotation of the input shaft than in prior art devices. In addition the shape and arrangement of the various elements making up the device, particularly the shape of the weights and movable element, as well as the arrangement of the opposing spring, may undergo all variations known from prior art devices. Finally, the applications of the device are multiple, with the device being capable of being used particularly as a speed governor or to control all sorts of servomechanisms. As a result, switch 120 in particular may be replaced with any other analogous system having two stable states, such as a hydraulic or pneumatic valve.

What is claimed as new and desired to be secured by Letters Patent of the United States is:

1. A weighted trigger device, comprising:
   a control system;
   a spring
   a movable element operatively associated with said spring;
   a plurality of rotatable weights;
   an input shaft for driving said rotatable weights, transforming centrifugal force to which said weights are submitted into an effort which tends to displace said movable element along the axis of said device against the force exerted by said spring so as to trigger said control system as soon as the speed of rotation of said input shaft exceeds a preset level, such that the resistance of said weights is positive and greater than the resistance of said spring in the position occupied by said movable element near the triggering of the control system.

2. Triggering device according to claim 1, further comprising a pivoting level wherein said spring acts upon said movable element by means of said pivoting lever, said lever including adjustable lever arms enabling the resistance of the spring's action to be modified.

3. Triggering device according to claims 1 or 2, further comprising means for adjusting the calibration of the spring in order to modify the threshold beyond which the control system is activated.

4. A weighted trigger device, comprising:
   a housing;
   a control system disposed within said housing;
   a spring operatively associated with said control system and having a predetermined spring rate;
   a plurality of rotatable and translatable weights operatively associated with said control system for producing a variable and predetermined centrifugal force;
   a movable element operatively associated with said rotatable weights and operatively associated with said spring;
   an input shaft for rotating said rotatable weights and for generating said variable and predetermined centrifugal force;
   and means for applying said centrifugal force to said spring at a positive rate greater than said predetermined spring rate.

5. The device of claim 4 further comprising an adjustable pivoting lever operatively associated with said means for applying said centrifugal force to said spring for adjusting the force of said spring.

6. The device of claim 4 or 5 further comprising means for adjusting the calibration of said spring in order to modify the threshold beyond which said control system is activated.

* * * * *